April 1, 1969 H. J. BEAUDRY 3,436,333

IMPEDANCE MATCHING NETWORK FOR GAS REACTION APPARATUS

Filed Aug. 23, 1966

INVENTOR.
HARVEY J. BEAUDRY

BY

ATTORNEY.

United States Patent Office 3,436,333
Patented Apr. 1, 1969

3,436,333
IMPEDANCE MATCHING NETWORK FOR GAS REACTION APPARATUS

Harvey James Beaudry, El Sobrante, Calif., assignor to Laboratory for Electronics, Inc., Boston, Mass., a corporation of Delaware Filed Aug. 23, 1966, Ser. No. 574,462
Int. Cl. B01k *1/00*
U.S. Cl. 204—312 2 Claims This invention relates to apparatus for ionizing a gas and reacting it with a non-gaseous substance, and more particularly it concerns the coupling of RF energy to an external field generating device which is effective to ionize the gas.

Figure 1:
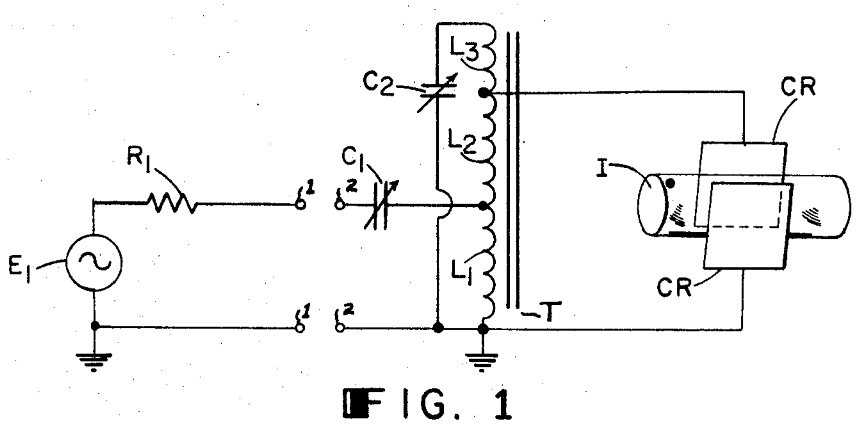

In the co-pending application of Richard L. Bersin, Ser. No. 524,103, filed Feb. 1, 1966 and entitled Gas Reaction Apparatus, there is disclosed improved apparatus for inducing reactions between a substance and a gas by ionizing the gas. The gas, such as oxygen, is fed into a reaction cell at relatively low pressure and is ionized by means of an RF field. A coil surrounding a portion of the cell is used to produce the field, and a suitable RF generator supplies the necessary energy to the coil.

As a substitute for such a coil, it has been found expedient in the case of certain cell configurations to employ a capacitor having relatively large plates disposed on opposite sides of the cell, or more particularly, that portion of the cell into which the gas is first introduced. In other words, the cell and its contents are primarily determinative of the dielectric properties of the capacitor. This makes it a problem to effect an efficient transfer of power from source to gas because of the fact that the dielectric constant of the gas changes appreciably when ionization occurs and hence so does the load impedance presented by the capacitor. Then too, load impedance is dependent to some extent upon the type of substance placed in the cell for reaction with the gas and also, of course, upon the nature of the gas itself. Since these are variables which cannot readily be accounted for by predetermined compensation, it follows that means to match the source to the load must be provided and that in order to be effective such means must be readily adjustable by trial and error.

It is an object of the present invention, therefore, to provide an improved form of matching network for use with apparatus of the above-mentioned character.

A more specific object is to provide an impedance matching network which is adapted to match an essentially constant source impedance which is resistive to a complex load impedance which may vary over a considerable range.

Still another object is to provide a simple and safe network of the above-mentioned character in which variable capacitors only provide the necessary means of adjustment.

Figure 2:
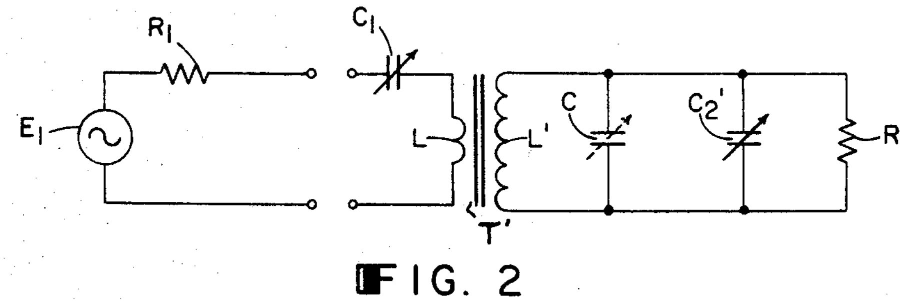

In brief, the matching network of the present invention makes use of an autotransformer having its common or primary winding coupled to the source through a series capacitor and a first secondary or series winding coupled to the field generating capacitor or load. The transformer has a second series winding which is coupled to a capacitor and this capacitor is variable as is likewse true of the first mentoned series capacitor. In general, the function of the first mentioned capacitor may be regarded as providing compensation for the inductance of the transformer primary such that the primary impedance becomes more nearly purely resistive. The function of the second mentioned capacitor is to compensate for changes in the impedance of the load such that the secondary impedance also becomes more nearly resistive but at a substantially higher impedance level than the primary. This is not to say, however, that the primary and secondary circuits separately are tuned to resonance in order to match source and load, inasmuch as the source impedance and the turns ratio of the transformer remain fixed. Instead, as will appear more clearly hereinafter, a perfect impedance match is obtained by a unique combination of capacitor settings providing values which satisfy a predetermined complex relation to the value assumed by the load. The novel features of the invention together with further objects and advantages will become apparent from the following detailed description of a preferred embodiment and from the accompanying drawing to which the description refers. In the drawing:

FIG. 1 is a schematic diagram of the matching network in accordance with the invention; and FIG. 2 is a network equivalent of the network FIG. 1.

With reference now to the drawing, it will be observed that $E_1$ designates the source voltage and $R_1$ designates the source impedance. The load is represented diagrammatically in the form of a pair of capacitor plates CR having a gas cell I interposed between them.

To couple the source to the load, in accordance with the present invention, there is provided a network including an autotransformer T and a pair of capacitors $C_1$ and $C_2$. Transformer T has a primary or common winding $L_1$ and capacitor $C_1$ is connected in series between the source and winding $L_1$. Transformer T also has a pair of secondary or series windings $L_2$ and $L_3$, the former of which is connected to the load CR and the latter of which is connected to capacitor $C_2$. The connections to the transformer may also be thought of in terms of winding ends and taps, a first of the winding ends being connected in common and the other winding end being connected to capacitor $C_2$. The taps, in turn, are connected to capacitor $C_1$ and load CR, respectively.

The operation of the network can best be explained with reference to the equivalent network of FIG. 2. In FIG. 2, autotransformer T has been replaced by an equivalent transformer T′ having primary winding L and a secondary winding L′. If it is assumed that transformer T approximates the ideal, that is, leakage flux can be neglected which is a fair assumption for purposes of fundamental analysis, then the primary inductance L of equivalent transformer T′ is equal to the inductance $L_1$ and secondary inductance L′ is equal to $L_1+L_2$. Also, in the equivalent network of FIG. 2 transformer winding $L_3$ has been eliminated and its impedance transforming effect has been accounted for by assigning an altered value $C_2'$ to capacitor $C_2$ of FIG. 1. Based on the assumption of an ideal transformer T, it follows that $$C_2'=C_2\frac{L_1+L_2L_3}{L_1+L_2}$$

Finally, as shown in FIG. 2, capacitor C and resistor R are connected in parallel with capacitor $C_2'$ across secondary winding L′ to represent the capacitive and resistive components of the load impedance which is presented by capacitor CR and its associated gas cell I of FIG. 1.

The conditions for a perfect impedance match between source and load in a network like that of FIG. 2 are given on p. 141 of the reference handbook "Reference Data for Radio Engineers" fourth edition published by Federal Telephone and Radio Corporation, namely $$X_{12}=\sqrt{(R_{11}^2+X_{11}^2)(R_{22}^2+X_{22}^2}$$

and $$X_{11}/R_{11}=X_{22}/R_{22}$$

where:

$X_{11}$ is the reactance of the primary with no load
$X_{22}$ is the open circuit reactance of the secondary circuit with no load and the source voltage disconnected
$X_{12}$ is the transfer impedance.

With specific reference to FIG. 2 it follows that:

$$X_{11}=J\omega L-\frac{J}{\omega C_1}\quad X_{22}=\frac{1}{J(\omega\Gamma-\omega C_0)}$$

$$X_{12}=J\omega M$$

where $$\Gamma=1/L'$$

$$M=\frac{N_2}{N_1}L$$

$$C_0=C+C_2'$$

Therefore, by appropriate adjustment of capacitors $C_1$ and $C_2$ to obtain values which satisfy these relations it is seen that a perfect match can be obtained with the result that power is transferred from source to load with optimum efficiency.

In a practical sense, these values can be conveniently arrived at through the use of a reflected power indicating device connected in circuit between the source and the matching network, that is between terminals 1—1 and 2—2. First capacitor $C_1$ is adjusted until the indicating device or meter indicates minimum reflected power and then capacitor $C_2$ is adjusted for the same condition. Usually, breakdown or ionization of the gas will occur at this point, but if not, the process is repeated until breakdown does occur, which, of course, alters the impedance of the load as represented by capacitor C and resistor R. Therefore, capacitors $C_1$ and $C_2$ are again individually adjusted for minimum reflected power, thereby optimizing the power transfer from source load.

Although the invention has been described in connection with a capacitive type load, it will be appreciated that the principles which are applicable in this connection may also be used to advantage with an inductive load. Also, further refinements of the network will no doubt occur to those skilled in the art such as, for example, the addition of still another adjustable capacitor in series with the load. Therefore, the invention should not be deemed to be limited to the details of what has been described herein but rather it should be deemed to be limited only by the scope of the appended claims.

What is claimed is:

1. In an apparatus for reacting a gas with a non-gaseous substance, including an RF source and means to generate an RF field for ionizing the gas, the combination with said source and said field generating means of a coupling network to transfer RF power from source to gas through the medium of said field generating means, said coupling network comprising:

(a) a variable capacitor to compensate for changes in the load presented by said field generating means, (b) transformer means to increase the effective value of said capacitor and to transform the resistive component of the load impedance to a value more nearly equal to that of the source, said transformer means having a primary winding coupled to said source, a first secondary winding coupled to said field generating means, and a second secondary winding coupled to said capacitor, and (c) another variable capacitor connected in series between said source and said primary winding to compensate for the inductance of said primary winding.

2. The combination according to claim 1 wherein said windings are interconnected to form an autotransformer having one of its winding ends connected in common, a first tap connected in circuit with said first mentioned capacitor and said source, a second tap connected in circuit with said field generating means, and its other winding end connected in circuit with said other capacitor.

References Cited

UNITED STATES PATENTS 3,305,466 2/1967 McCoy ---------- 204—312 X

HOWARD S. WILLIAMS, *Primary Examiner.*

U.S. Cl. X.R.

333—32